United States Patent

[11] 3,539,029

| [72] | Inventors | Cecil W. Bopp;<br>James B. Porter, Jr., and William H. Cone,<br>Waterloo, Iowa |
|---|---|---|
| [21] | Appl. No. | 682,347 |
| [22] | Filed | Nov. 13, 1967 |
| [45] | Patented | Nov. 10, 1970 |
| [73] | Assignee | Construction Machinery Company<br>Waterloo, Iowa<br>a corporation of Iowa |

[54] WEIGHING APPARATUS WITH HYDRAULIC CYLINDER PIVOT MEANS FOR EMPTYING INTO MIXING DRUM
4 Claims, 16 Drawing Figs.

[52] U.S. Cl. .................................................. 177/145,
222/166
[51] Int. Cl. .................................................. G01g 19/00
[50] Field of Search .................................... 177/145,
161; 222/166; 92/163(Inq.); 91/26, 394, 407(Inq.)

[56] References Cited
UNITED STATES PATENTS

| 1,622,984 | 3/1927 | Vogel .......................... | 177/145 |
| 2,605,096 | 7/1952 | Bradley ....................... | 177/145X |
| 2,833,312 | 5/1958 | Flick ............................ | 91/26X |
| 2,911,952 | 11/1959 | Peras ........................... | 91/394X |
| 3,025,836 | 3/1962 | Cook et al. .................. | 91/26 |
| 3,267,815 | 8/1966 | Ortman et al. ............... | 91/26 |
| 3,358,887 | 12/1967 | Taccone ...................... | 222/166 |

*Primary Examiner*—Richard B. Wilkinson
*Assistant Examiner*—George H. Miller, Jr.
*Attorney*—Dick, Zarley, McKee & Thomte

ABSTRACT: A combination weighing and mixing apparatus for fertilizer or the like comprising a skip loader normally freely supported on a weigh scale and which is pivotal about one of its upper ends by a hydraulic cylinder means to facilitate the dumping of the material therefrom into a mixing drum after the material has been weighed. The mixing drum is of the type used in the cement mixing industry and is designed to mix the material deposited therein while revolving in one direction and to discharge the material therefrom while revolving in the opposite direction. The apparatus also includes means for automatically freeing the skip loader from the cylinder means and the skip loader support means while the skip loader is supported on the weigh scale. The cylinder means includes means thereon to insure that the skip loader will be gently placed on the weigh scale after the material has been dumped therefrom.

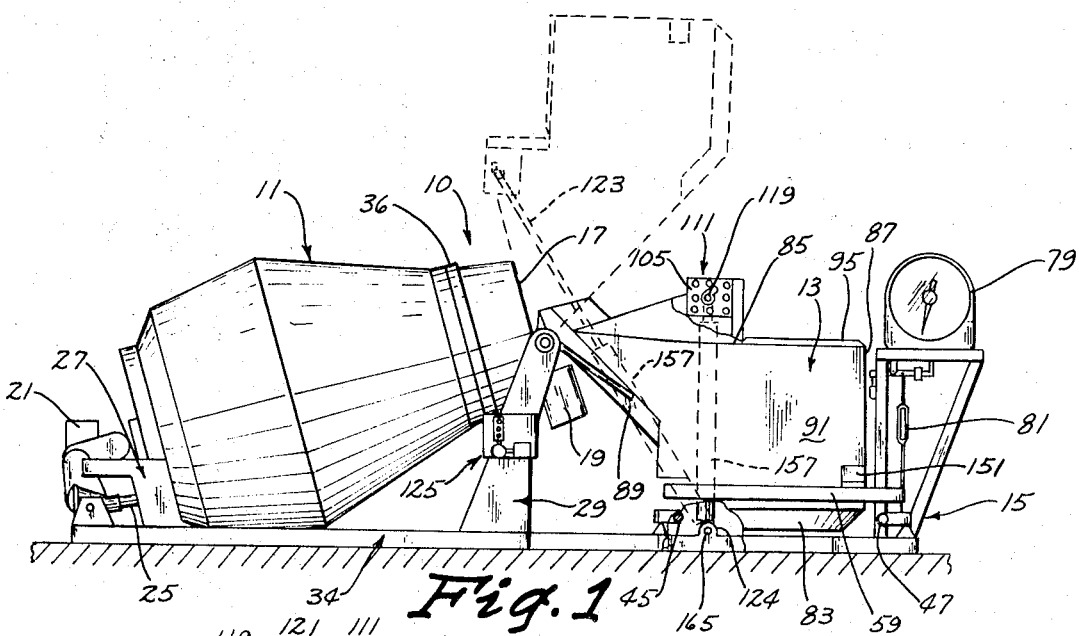
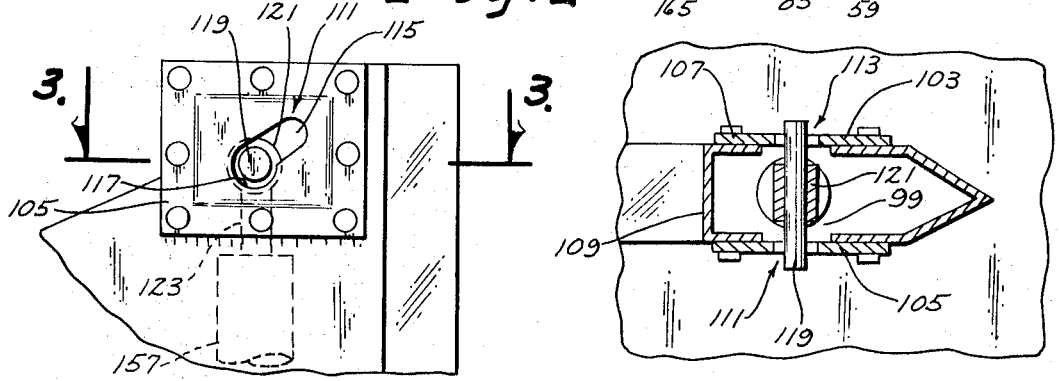
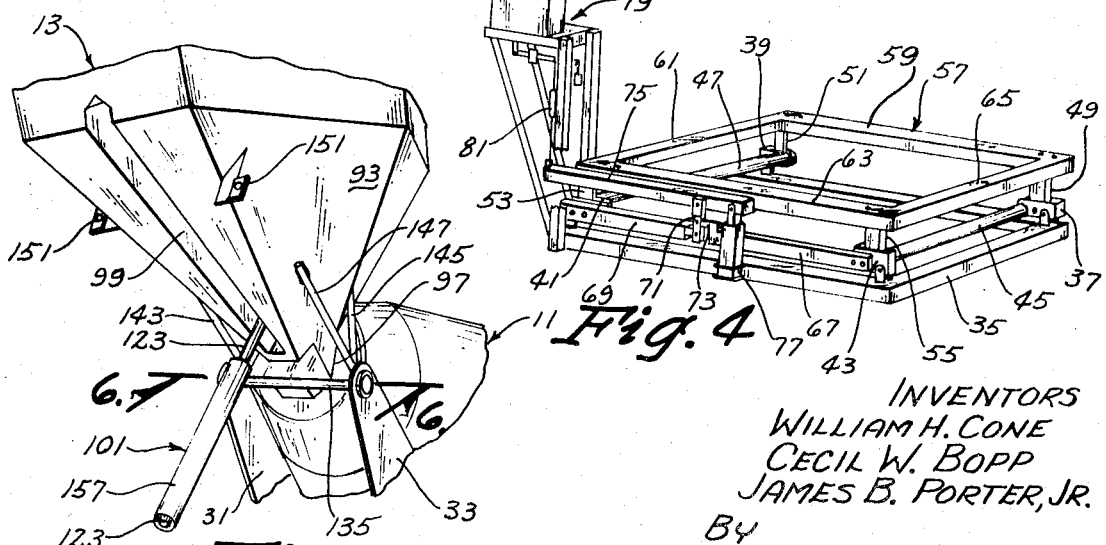

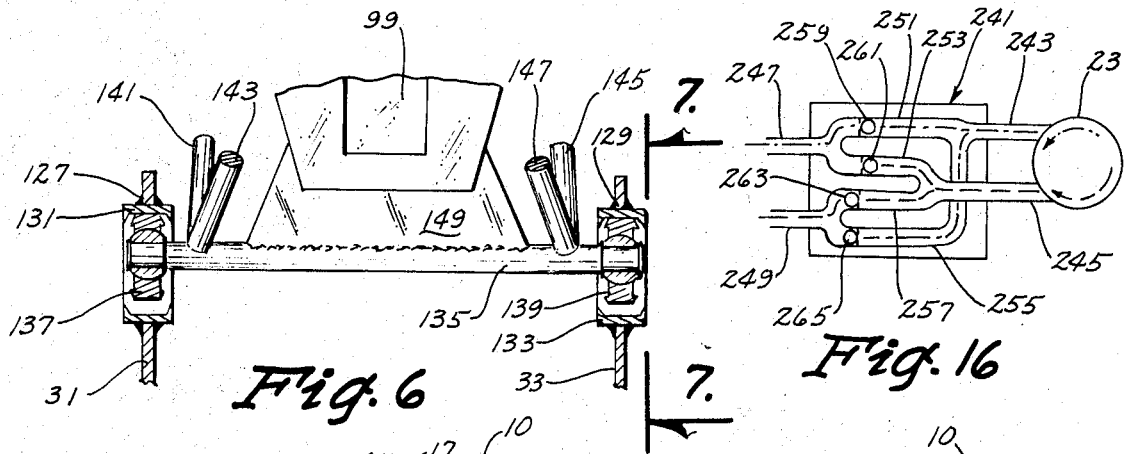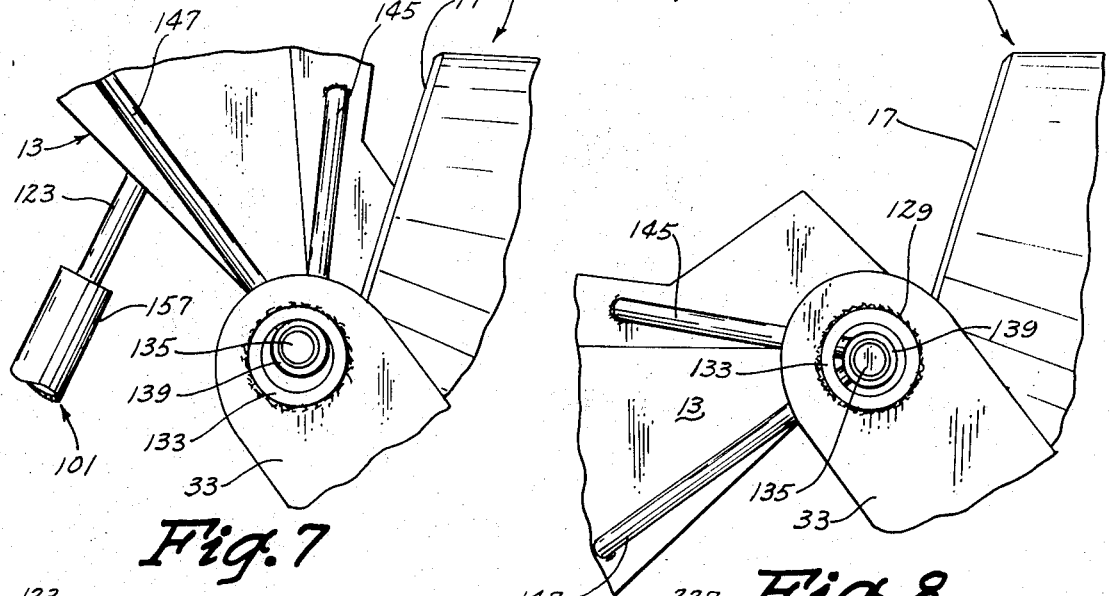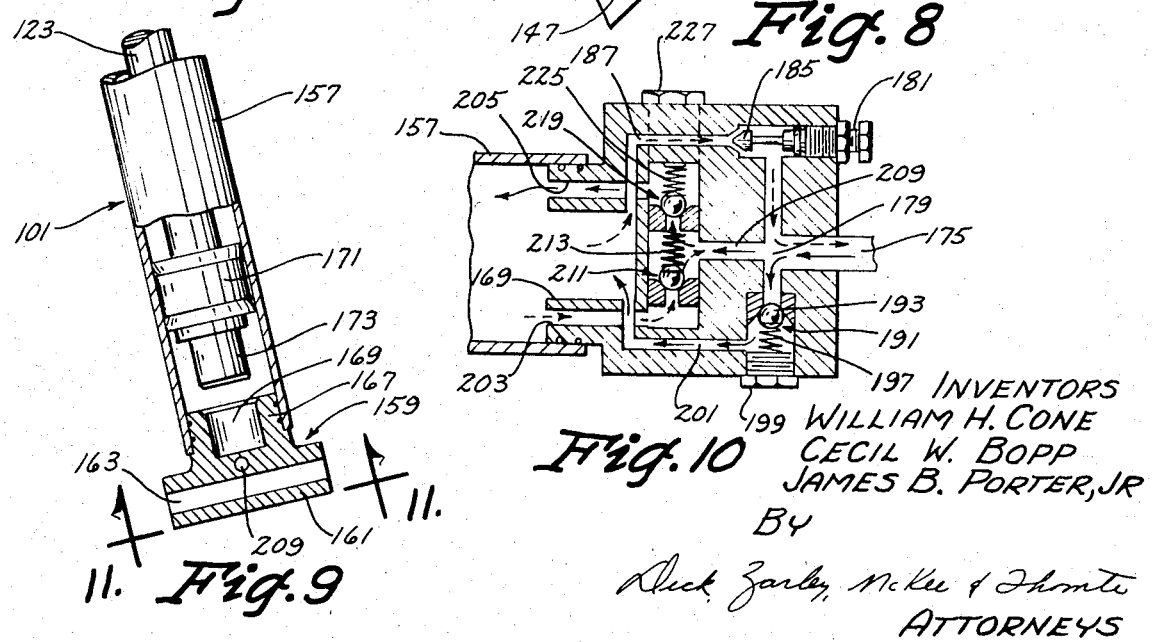

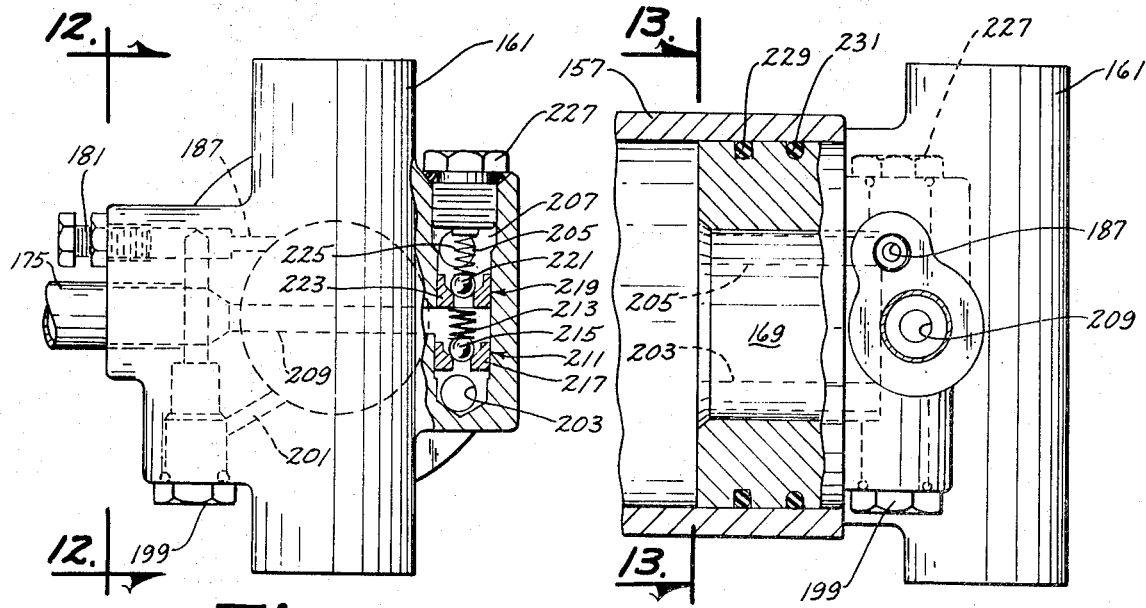
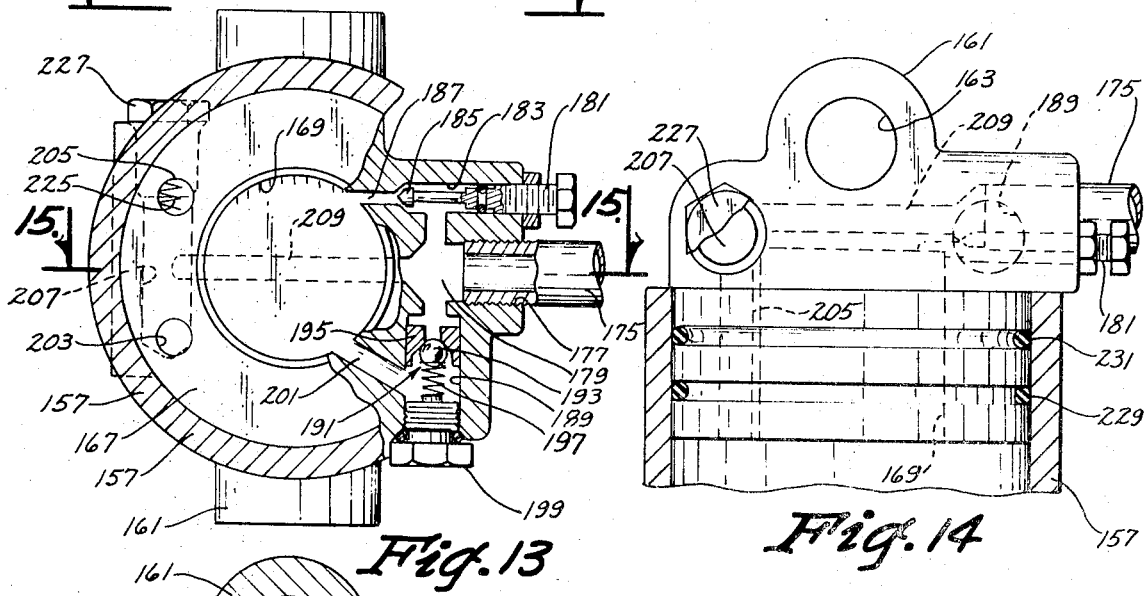
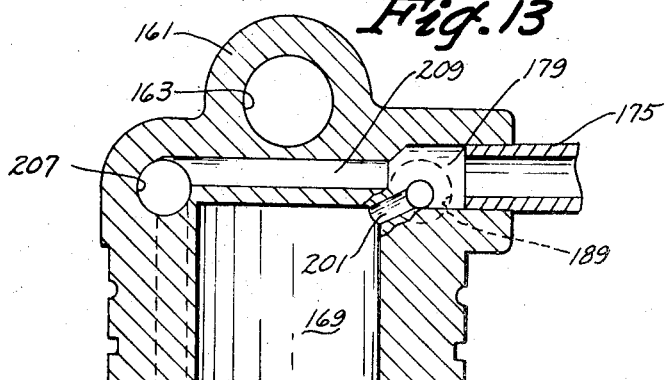

WEIGHING APPARATUS WITH HYDRAULIC CYLINDER PIVOT MEANS FOR EMPTYING INTO MIXING DRUM

Conventional weighing devices for use in the fertilizer industry or the like have V-shaped bottoms so that the material can be dumped from the bottom thereof onto a conveyor belt after the material has been weighed. These machines are of limited capacity and are at a height disadvantage which is caused by the V-shaped bottom. Additionally, the material does not flow in a satisfactory manner onto the conveyor belt and static electricity will cause the material to stick to the belt. Additionally, the conventional weighing machines or weigh hoppers are slow in operation.

Therefore, it is a principal object of this invention to provide a combination weighing and mixing apparatus for fertilizer or the like.

A further object of this invention is to provide a combination weighing and mixing apparatus which has a large capacity.

A further object of this invention is to provide a combination weighing and mixing apparatus which requires only a minimum of height in which to operate.

A further object of this invention is to provide a combination weighing and mixing apparatus which permits a weighing and mixing cycle to be quickly completed.

A further object of this invention is to provide a combination weighing and mixing apparatus wherein the skip loader and the mixing drum are operated by a common motor means but which separately function from each other.

A further object of this invention is to provide a combination weighing and mixing apparatus for fertilizer or the like including a skip loader which is adapted to be pivoted from a position on a scale means to a dumping position, the skip loader being free from its pivotal supporting means and its power means during the weighing operation.

A further object of this invention is to provide a combination weighing and mixing apparatus for fertilizers or the like including a skip loader which is pivoted by a hydraulic cylinder means, the hydraulic cylinder means having means thereon which causes the skip loader to be gently lowered to the weigh scale.

A further object of this invention is to provide a hydraulic rectifier for use with a reversible gear pump.

A further object of this invention is to provide a combination weighing and mixing apparatus for fertilizer or the like which is durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side view of the apparatus with the broken lines indicating the position to which the skip loader is pivoted to cause the material therein to be dumped into the mixing drum;

FIG. 2 is a fragmentary side view of the pivotal connection of the rod end of the hydraulic cylinder means and the skip loader;

FIG. 3 is a sectional view as seen along lines 3–3 of FIG. 2;

FIG. 4 is a perspective view of the weigh scale;

FIG. 5 is a fragmentary perspective view illustrating the skip loader in a raised or dumping position;

FIG. 6 is an enlarged sectional view as seen on lines 6–6 of FIG. 5;

FIG. 7 is a view as seen along line 7–7 of FIG. 6;

FIG. 8 is a view similar to FIG. 7 except that the skip loader is pictured in its lowered or weighing position;

FIG. 9 is a side view of the lower end of the hydraulic cylinder means with portions thereof cut away to more fully illustrate the invention;

FIG. 10 is a schematic view illustrating the flow path of the hydraulic cylinder fluid within the end casting of the hydraulic cylinder;

FIG. 11 is a view of the hydraulic cylinder as seen on line 11–11 of FIG. 9 with portions thereof cut away to more fully illustrate the invention;

FIG. 12 is a sectional view as seen on line 12–12 of FIG. 11;

FIG. 13 is a sectional view as seen on line 13–13 of FIG. 12;

FIG. 14 is a sectional view as seen on line 14–14 of FIG. 13;

FIG. 15 is a sectional view as seen on line 15–15 of FIG. 13; and

FIG. 16 is a schematic view of the hydraulic rectifier and its associated apparatus.

The apparatus of this invention is generally designated by the reference numeral 10 and includes a mixing drum 11, skip loader 13 and weigh scale 15. Mixing drum 11 is of the type generally used in the cement mixing industry and includes a plurality of fins or vanes in the interior thereof which are adapted to mix the material contained in the drum upon the drum being revolved in one direction and adapted to discharge the material therefrom when the drum 11 is revolved in the opposite direction. Drum 11 includes an open upper end 17 having a discharge spout portion 19 in communication therewith as indicated in FIG. 1. Drum 11 is powered by any convenient power means such as a reversible electric motor 21 which is operatively connected to drive shaft 25 by pulleys, belts, etc. Drive shaft 25 is operatively connected to a chain (not shown) which is connected to one end of the drum 11 for rotation thereof when the power means is activated. The rear end of the drum 11 is rotatably supported by support means 27 while the forward end thereof is rotatably supported by support means 29. Support means 29 includes a pair of spaced-apart arms 31 and 33 extending upwardly from a base support 34. Drum 11 includes a bearing surface 36 extending therearound which engages rollers which are secured to and are positioned between arms 31 and 33 to provide rotational support for the forward end of the drum 11.

Weigh scale 15 includes a base 35 which is secured to base support 34 and which has supports 37, 39, 41 and 43 pivotally mounted at the corners thereof. As seen in FIG. 4, a pipe 45 is secured to and extends between the inner ends of supports 37 and 43 and a pipe 47 is secured to and extends between the inner ends of supports 39 and 41. Each of the supports 37, 39, 41 and 43 are provided with a suitable bearing surface which support legs 49, 51, 53 and 55 extending upwardly therefrom which have a frame means 57 secured thereto comprised of frame members 59, 61, 63 and 65. A pivot arm 67 is secured to support 43 and extends inwardly therefrom while a pivot arm 69 is secured to support 41 and extends inwardly therefrom in a parallel relationship with respect to pivot arm 67. As seen in FIG. 4, the inner ends of pivot arms 67 and 69 are in a spaced relation with respect to each other and have connection members 71 and 73 secured thereto and extending upwardly therefrom. Connection members 71 and 73 are connected to a beam 75, one end of which is operatively connected to a dash pot means 77. The other end of beam 75 is connected to the weigh scale indicator 79 by means of a cable arrangement 81. Thus, when weight is imposed on frame means 57, the inner ends of pivot arms 67 and 69 will be pivoted downwardly thereby causing the left end of beam 75 (as viewed in FIG. 4) to be pivoted downwardly thereby causing scale indicator 79 to indicate the amount of weight imposed on the weigh scale.

Skip loader 13 includes a bottom 83, top 85, ends 87 and 89 and sides 91 and 93. The interior of skip loader 13 is hollow and an opening 95 is provided in the upper end thereof adjacent end 87 through which the materials to be weighed are deposited. The top 85 of skip loader 13 is closed forwardly of opening 95 but a discharge opening 97 is provided at the extreme end thereof to facilitate the dumping of the materials from the interior of the skip loader when the skip loader has been raised to the position illustrated by broken lines in FIG. 1. As best illustrated in FIG. 5, the lower portion of skip loader 13 is provided with an elongated channel 99 which receives a hydraulic cylinder 101 extending thereinto. The interior of channel 99 is sealed from the interior of the skip loader 13 to prevent material from passing out of the interior of the loader therethrough. A pair of spaced-apart brackets 103 and 105 are secured to the skip loader at opposite sides of the channel 99 by bolts 107 as illustrated in FIG. 3. As seen in FIG. 3, a channel member 109 is secured to and extends between one end of the brackets 103 and 105. Brackets 103 and 105 are provided with openings 111 and 113 formed therein respectively. Inasmuch as the openings 111 and 113 are identical, only opening 111 will be described. Opening 111 is seen to include an inclined slot portion 115 which is in communication with an enlarged circular portion 117 at the lower end thereof. The openings 111 and 113 are adapted to receive a pin 119 extending therethrough which is secured to a collar 121 secured to the upper end of the rod 123 of hydraulic cylinder 101. The lower end of hydraulic cylinder 101 is pivotally connected to a support means 124 which is connected to the base support 34. Hydraulic cylinder 101 is of the double-action-type and is operatively connected by suitable conduits to a hydraulic gear pump 23 which is driven by motor 21. The hydraulic system also includes conventional control valves and a reservoir which will not be described in detail. A control means 125 is provided on arm 31 for the convenient control of the mixing drum 11 and the skip loader 13.

The upper ends of arms 31 and 33 are provided with circular openings 127 and 129 formed therein which have bearing surfaces 131 and 133 mounted therein respectively and secured thereto by welding or the like. A rod 135 having bearings 137 and 139 secured to its opposite ends is mounted as viewed in FIG. 6. As seen in FIG. 6, bearing 137 rotatably engages bearing surface 131 while bearing 139 rotatably engages bearing surface 133. It can be seen from FIGS. 6 and 7 that the inside diameter of the bearing surfaces are larger than the outside diameter of the bearings. The bearing surfaces and bearing races are tapered to aid in positioning the skip loader. A pair of brace arms 141 and 143 are secured at one of their ends to rod 135 adjacent one end thereof and are secured at their other ends to one side of skip loader 13. A pair of brace arms 145 and 147 are secured at one of their ends to rod 135 adjacent the other end thereof and are secured at their other ends to the other side of skip loader 13. A plate 149 is secured to rod 135 by welding inwardly of the brace arms and one end of skip loader 13 is secured thereto by welding or the like so that skip loader 13 will pivot with respect to the bearing surfaces 131 and 133 upon the activation of hydraulic cylinder 101. As seen in FIGS. 1 and 5, skip loader 13 is provided with a plurality of outwardly extending supports 151 which are designed to engage the upper surface of frame means 57 to center the skip loader 13 with respect to the weigh scale 15 and to provide a suitable support for the skip loader when the same is positioned on the weigh scale. FIG. 2 illustrates the relationship of the pin 119, which is connected to the rod 123 of hydraulic cylinder 101, and it can be seen that the pin is free from engagement with the bracket 105 when the skip loader is positioned on the weigh scale. Thus, the skip loader 13 is free of any engagement with the hydraulic cylinder when the skip loader is on the weigh scale thereby insuring that an accurate measurement will be obtained. The extension of rod 123 will cause the pin 119 to pass from the circular opening portion 117 of opening 111 and to pass into the opening portion 115. Thus, the pin 119 engages the upper end of the opening 111 and further extension of the rod causes the skip loader to be pivoted about the upper ends of arms 29 and 31 in the manner previously described. FIG. 8 illustrates the fact that the rod 135 and the bearings associated therewith are free from any engagement with the arms 31 or 33 when the skip loader 13 is supported on the weigh scale. The extension of rod 123 will cause the bearings to engage the bearing surfaces 131 and 133 in the manner illustrated in FIG. 7 to provide a substantially frictionless pivotal connection between the upper ends of the arms 31 and 33 and the skip loader when the same is being pivoted to its dumping position as illustrated in FIG. 7. When the skip loader is lowered to the weigh scale 15, the skip loader is automatically positioned on the weigh scale such that the bearings on the opposite ends of the rod 135 are free from engagement with the upper ends of the arms 31 and 33 thereby insuring that an accurate weight measurement will be obtained.

Hydraulic cylinder 101 includes a body portion 157 through which rod 123 extends. The lower end of hydraulic cylinder 101 has a cylinder end casting 159 secured thereto by any convenient means such as welding, snap rings or the like. End casting 159 includes a base portion 161 having an elongated opening 163 formed therein which is adapted to receive a pivot pin 165 to facilitate the pivotal connection of the hydraulic cylinder with the support means 124. End casting 159 is provided with an upper cylindrical portion 167 having a pocket 169 formed therein which is complementary to the lower end of the cylinder rod 123 and which is adapted to receive the same. Rod 123 is provided with a conventional piston 171 provided thereon above the lower end thereof. Thus, when the lower end 173 of rod 123 is received within the pocket 169, the lower end of the piston 171 will abut the upper end of the cylindrical portion 167.

A conduit 175 is threadably secured to an opening 177 formed in the end casting 159 and is in communication with a chamber portion 179 as illustrated in FIG. 13. An adjusting screw 181 is operatively mounted in a bore 183 in the end casting 159 and has a valve 185 on its inner end which is adapted to selectively close a port 187 which extends between the lower end of pocket 169 and the chamber portion 179.

End casting 159 is also provided with a bore 189 having a check valve means 191 provided therein. Check valve means 191 includes a ball valve 193 which is yieldably urged into seating engagement with a valve seat 195 by a spring means 197. As seen in FIG. 13, the check valve means 191 is maintained in the bore 189 by means of a cap screw 199. A port 201 extends from the lower end of pocket 169 to bore 189 at a point below the ball valve 193 as illustrated in FIG. 13 to permit the flow of hydraulic fluid from the chamber portion 179, through check valve means 191 and through the port 201 into the pocket 169 at times.

The upper end of the cylindrical portion 167 of end casting 159 is provided with a pair of openings 203 and 205 extending downwardly thereinto which are in communication with a bore 207 formed in end casting 159. A port 209 is provided in cylinder end casting 159 and extends from the bore 207 to the chamber portion 179 at a point below the lower end of the pocket 169. As seen in FIG. 11, a check valve means 211 is positioned between opening 203 and port 209 and has a spring means 213 yieldably urging a ball valve 215 into seating engagement with a valve seat 217 to permit the flow of hydraulic fluid from the opening 203 into the port 209 when the resistance of the spring means 213 is overcome. A check valve means 219 is also provided in bore 207 between the opening 205 and the bore 209 and includes a ball valve 221 which is yieldably urged into seating engagement with a valve seat 223 by a spring means 225 to permit the flow of hydraulic fluid from bore 209 through the opening 205 when the resistance of the spring means 225 is overcome. Check valve means 211 and 219 are maintained within bore 207 by a cap screw 227. It should be noted that spring means 213 is substantially stronger than spring means 225 and should preferably require approximately 100 pounds of pressure before the ball valve will unseat from its valve seat.

As seen in FIG. 12, cylindrical portion 167 of the end casting 159 is provided with a pair of grooves 229 and 231 formed therein which are adapted to receive O-rings to prevent leakage of hydraulic fluid from the interior of the hydraulic cylinder. Conduit 175 is operatively connected to the hydraulic pump and a suitable conduit operatively connects the upper interior end of the hydraulic cylinder with the hydraulic pump to achieve the double action within the hydraulic cylinder. The end casting 159 is provided so that the skip loader will be gently lowered to the weigh scale. The weight of the skip loader is such that a conventional double-acting hydraulic cylinder could not satisfactorily support the weight of the skip loader which would cause the skip loader to lower rapidly thereby drawing a vacuum on the top side of the piston. The employment of end casting 159 in this invention controls the flow of hydraulic fluid from the lower end of the hydraulic cylinder as the skip loader is being lowered onto the weigh scale thereby insuring that the weigh scale will not be damaged as the skip loader is placed thereon. As the skip loader is being lowered, the hydraulic fluid will normally pass from the hydraulic cylinder by means of opening 205, port 209 and conduit 175 as well as port 187. As the lower end 173 of the rod 123 enters the pocket 169, the fluid in the pocket 169 will be forced outwardly therefrom through port 187 and past valve 185 into chamber portion 179 and conduit 175. It can be appreciated that the adjusting screw 181 can be adjusted to regulate the flow of fluid through the port 187. The fluid that is trapped between the lower end of the piston and the upper surface of cylindrical portion 167 will be forced through opening 203 and into port 209 and thence into conduit 175. Thus, the adjusting screw 181 permits the control of the fluid flow from the lower end of the hydraulic cylinder thereby insuring that the skip loader will be lowered smoothly and gently onto the weigh scale. When the hydraulic pump is activated to cause the skip loader to be raised from the weigh scale, hydraulic fluid will pass through conduit 175, port 209 and upwardly through opening 205 thereby supplying hydraulic fluid at a point below the piston 171. Hydraulic fluid is supplied to the pocket 169 by passing through check valve means 191 and port 201. The fact that it is necessary to create approximately 100 pounds of pressure on ball valve 215 before opening 203 and port 209 are in communication with each other prevents a vacuum from occurring on the top side of the piston as the skip loader is being lowered onto the weigh scale.

A hydraulic rectifier 241 is required for the hydraulic system inasmuch as the hydraulic gear pump 23 will be reversed as the motor 21 is reversed. Without hydraulic rectifier 241, the reversing of the gear pump 23 by the motor 21 would cause the operation of hydraulic cylinder 101 to be also reversed, that is, the pressure side would become the suction side and vice versa. Pump 23 is connected to rectifier 241 by conduits 243 and 245. The rectifier 241 has suction and pressure conduits 247 and 249 extending therefrom which are in operative communication with the hydraulic cylinder 101. A conduit 251 connects conduits 243 and 247 while a conduit 253 connects conduits 245 and 247. A conduit 255 connects conduits 243 and 249 while a conduit 257 connects conduit 245 and 249. Check valve means 259, 261, 263 and 265 are provided in conduits 251, 253, 257 and 255 respectively and are adapted to permit the flow of hydraulic fluid therethrough as indicated in FIG. 16. Thus, when motor 21 is running in the direction to cause mixing drum 11 to mix the materials therein, gear pump 23 will supply hydraulic fluid under pressure to hydraulic cylinder 101 through conduit 243, conduit 255, check valve means 265, and conduit 249 while sucking the hydraulic fluid from cylinder 101 through conduit 247, check valve means 261, conduits 253 and 245. Conversely, when motor 21 is running in the opposite direction to cause mixing drum 11 to discharge the materials therefrom, gear pump 23 will supply hydraulic fluid under pressure to hydraulic cylinder 101 through conduits 245 and 257, check valve means 263 and conduit 249 while sucking the hydraulic fluid from cylinder 101 through conduit 247, check valve means 259, and conduits 251 and 243. It can therefore be seen that the flow direction within conduits 247 and 249 remains the same regardless of the direction of rotation of pump 23 and motor 21.

In operation, the skip loader 13 is normally positioned on the weigh scale 15 and is free from its engagement with the hydraulic cylinder means and its support means 29 as previously described so that the weigh measurement will be accurate. The materials to be mixed are then dumped into the skip loader 13 by any convenient means until the proper weight is achieved. Control means 125 is then operated to cause the pivotal movement of the skip loader 113 as previously described from the position shown in full lines in FIG. 1 to the position shown in broken lines in the same FIG. Thus, when the skip loader has been elevated to the position shown by broken lines in FIG. 1, the material contained therein will be dumped into the interior of the mixing drum 11. The skip loader 13 is then lowered onto the weigh scale for the next cycle. The mixing drum 11 is rotated in one direction to mix the materials deposited therein for the proper length of time and then are discharged therefrom by causing the rotation of the mixing drum in an opposite direction. The materials will be discharged from the mixing drum 11 onto the discharge chute portion 19 for transportation to the desired location. It is sometimes advantageous to have the mixing drum 11 rotating in the discharge direction while the skip loader 13 is elevating. Such a situation would be in the event that no blending is required so that it would only be necessary to weight the material and to discharge the same onto the conveyor. For example, if the operator wants to load out a predetermined amount of a single material, the operator weighs the material into the skip loader 13 and then elevates the skip loader with the mixing drum rotating in the discharge direction. This deposits the material on the discharge spout portion 19 or load-out apparatus and permits the material to be deposited on the conveyor without going through the mixing drum. It can be appreciated that the hydraulic cylinder 101 would function in an opposite manner to that desired during such an operation if the hydraulic rectifier 241 were not provided in the system. It can be appreciated that the structure of the apparatus as illustrated in FIG. 1 requires a minimum amount of height in which to operate and that means has been provided for efficiently weighing and mixing fertilizer or the like. The apparatus as illustrated in FIG. 1 has a large capacity and the weighing and mixing cycle can be accomplished in a minimum amount of time due to the unique arrangement thereof. Thus it can be seen that the device accomplishes at least all of its stated objectives.

We claim:
1. In an apparatus of the class described:
a weigh scale means adapted to indicate the weight placed thereon;
a support means spaced from said scale means and having an upper end;
a hopper means pivotally secured about a horizontal axis to said support means upper end and being pivotally movable from a first position on said scale means to a dumping position;
power means connected to said hopper means adapted to pivotally move said hopper means;
said power means being a hydraulic cylinder means pivotally connected to said hopper means so that said hopper means is free of any connection therewith when said hopper means is on said weigh scale means;
said hopper means being pivotally connected to said support means so that said hopper means is free of any connection therewith when said hopper means is on said weigh scale means; and
said support means including upstanding spaced-apart arms having a circular opening formed therein adjacent their upper ends and a ring bearing mounted in each of said circular openings, a horizontal rod secured to said hopper means having its opposite ends received by said ring bearings, said rod having a rotatable bearing means secured to its opposite ends which is adapted to rotatably engage the ring bearing when said hopper is being pivoted, the inside diameter of said ring bearings being substantially greater than the outside diameters of said bearing means so that said bearing means will not engage said ring bearings when said hopper means is on said weigh scale means.

2. In an apparatus of the class described:
a weigh scale means adapted to indicate the weight placed thereon;
a pivotal support means spaced from said scale means;

a normally horizontal hopper means supported on said scale means;

support means on said hopper in spaced relation to said pivotal support means;

power means adapted to engage said hopper means to move said hopper means and said support means into pivotal engagement with said pivotal support means whereby said hopper means can be pivotally moved from a position on said scale to a dumping position on said pivotal support means; and said power means being free of any connection with said weigh scale means and said hopper means when said hopper means is on said weigh scale means, said power means being free of any connection with said weigh scale means when said hopper means is being moved to said dumping position.

3. The apparatus of claim 2 wherein said weigh scale means includes a frame means adapted to support said hopper means, said hopper means having means thereon adapted to engage said frame means to position said hopper means on said frame means so that said hopper means will be free from its connection with said support means and said hydraulic cylinder means.

4. The apparatus of claim 2 wherein said power means is a hydraulic cylinder means and wherein said hopper means includes spaced-apart, vertically disposed brackets having openings formed therein adapted to receive a pin extending horizontally therethrough, said pin being connected to the hydraulic cylinder rod end, each of said openings including a substantially circular opening portion which freely receives said pin when said hopper means is on said weigh scale means, each of said openings also including an inclined slot opening portion extending upwardly from said circular opening portion which is adapted to pivotally receive said pin when said hopper means is being pivotally moved.